(12) United States Patent
Oskotsky et al.

(10) Patent No.: US 10,782,509 B2
(45) Date of Patent: Sep. 22, 2020

(54) ORTHOSCOPIC PROJECTION LENS

(71) Applicant: BAE Systems Information and Electronic Systems Integration Inc., Nashua, NH (US)

(72) Inventors: Mark L Oskotsky, Mamaroneck, NY (US); Michael J Russo, Jr., Roslyn, NY (US); Daniel Engheben, Commack, NY (US); Erik L Hugel, Garden City, NY (US); Shawn C Reven, Greenlawn, NY (US); Vincent Lipari, Whitestone, NY (US); Jerry Ma, Flushing, NY (US); Yueli Zhang, Saint James, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 124 days.

(21) Appl. No.: 16/131,845

(22) Filed: Sep. 14, 2018

(65) Prior Publication Data

US 2020/0088974 A1    Mar. 19, 2020

(51) Int. Cl.
*G02B 13/02* (2006.01)
*G02B 9/62* (2006.01)
(Continued)

(52) U.S. Cl.
CPC .............. *G02B 13/02* (2013.01); *G02B 9/62* (2013.01); *G02B 13/006* (2013.01);
(Continued)

(58) Field of Classification Search
CPC .... G02B 13/02; G02B 13/0045; G02B 13/18; G02B 9/62; G02B 13/006; G02B 27/005;
(Continued)

(56) References Cited

U.S. PATENT DOCUMENTS 5,691,847 A    11/1997   Chen
6,023,375 A    2/2000    Kreitzer
(Continued)

OTHER PUBLICATIONS

Robert McCleod, Turning ideal imaging systems into real optics Chromatic aberrations. ECE 5616 OE System Design. Chromatic aberration, Retreived 181101, Retreived from https://docplayer.net/50328557-Turning-ideal-imaging-systems-into-real-optics-chromatic-aberrations-ece-5616-oe-system-design-chromatic-aberration.html, 9 pages.

*Primary Examiner* — William R Alexander
*Assistant Examiner* — Henry A Duong
(74) *Attorney, Agent, or Firm* — Maine Cernota & Rardin; Scott J. Asmus

(57) ABSTRACT

An orthoscopic, apochromatic lens is suitable for deployment such as on aerial platforms provides distortion less than 0.2% over a full field of view of more than 60° with F # less than 6.5 and focal length greater than 3", and in embodiments greater than 5". Embodiments are apochromatic from 500 to 950 nm to within 7 microns. Embodiments have an overall length of less than 7". The lens includes five optical groups with an aperture stop between the second and third groups. The optical groups have one, one, two, one and one optical element each, as ordered from the object to the image plane, and have positive, negative, positive, positive, and negative optical powers, respectively. Embodiments are telephoto. In embodiments the focal length is temperature invariant within 0.0015 inches from 0° C. to 40° C.

26 Claims, 11 Drawing Sheets

(51) Int. Cl.
  *G02B 13/00* (2006.01)
  *G02B 13/18* (2006.01)
  *G02B 27/00* (2006.01)
(52) U.S. Cl.
  CPC ......... *G02B 13/0045* (2013.01); *G02B 13/18* (2013.01); *G02B 27/005* (2013.01)
(58) Field of Classification Search
  CPC ... G02B 3/00; G02B 3/02; G02B 3/04; G02B 3/06; G02B 3/08; G02B 9/00; G02B 9/02; G02B 9/04; G02B 9/06; G02B 9/08; G02B 9/10; G02B 9/12; G02B 9/14; G02B 9/16; G02B 9/18; G02B 9/20; G02B 9/22; G02B 9/24; G02B 9/26; G02B 9/28; G02B 9/30; G02B 9/32; G02B 9/34; G02B 9/36; G02B 9/38; G02B 9/40; G02B 9/42; G02B 9/44; G02B 9/46; G02B 9/48; G02B 9/50; G02B 9/52; G02B 9/54; G02B 9/56; G02B 9/58; G02B 9/60; G02B 9/64; G02B 13/00; G02B 13/002
  USPC .......................................................... 359/713
  See application file for complete search history.

(56) References Cited

U.S. PATENT DOCUMENTS

| | | |
|---|---|---|
| 7,405,890 B2 | 7/2008 | Nakamura |
| 8,531,578 B2 | 9/2013 | Matsusaka et al. |
| 9,297,987 B2 | 3/2016 | Oskotsky et al. |
| 2012/0147483 A1 | 6/2012 | Oskotsky et al. |
| 2019/0064481 A1* | 2/2019 | Zhang ................... G02B 9/60 |
| 2019/0346661 A1* | 11/2019 | Yeh ........................ G02B 9/60 |
| 2020/0073084 A1* | 3/2020 | Yamazaki ............ G02B 15/145 |

* cited by examiner

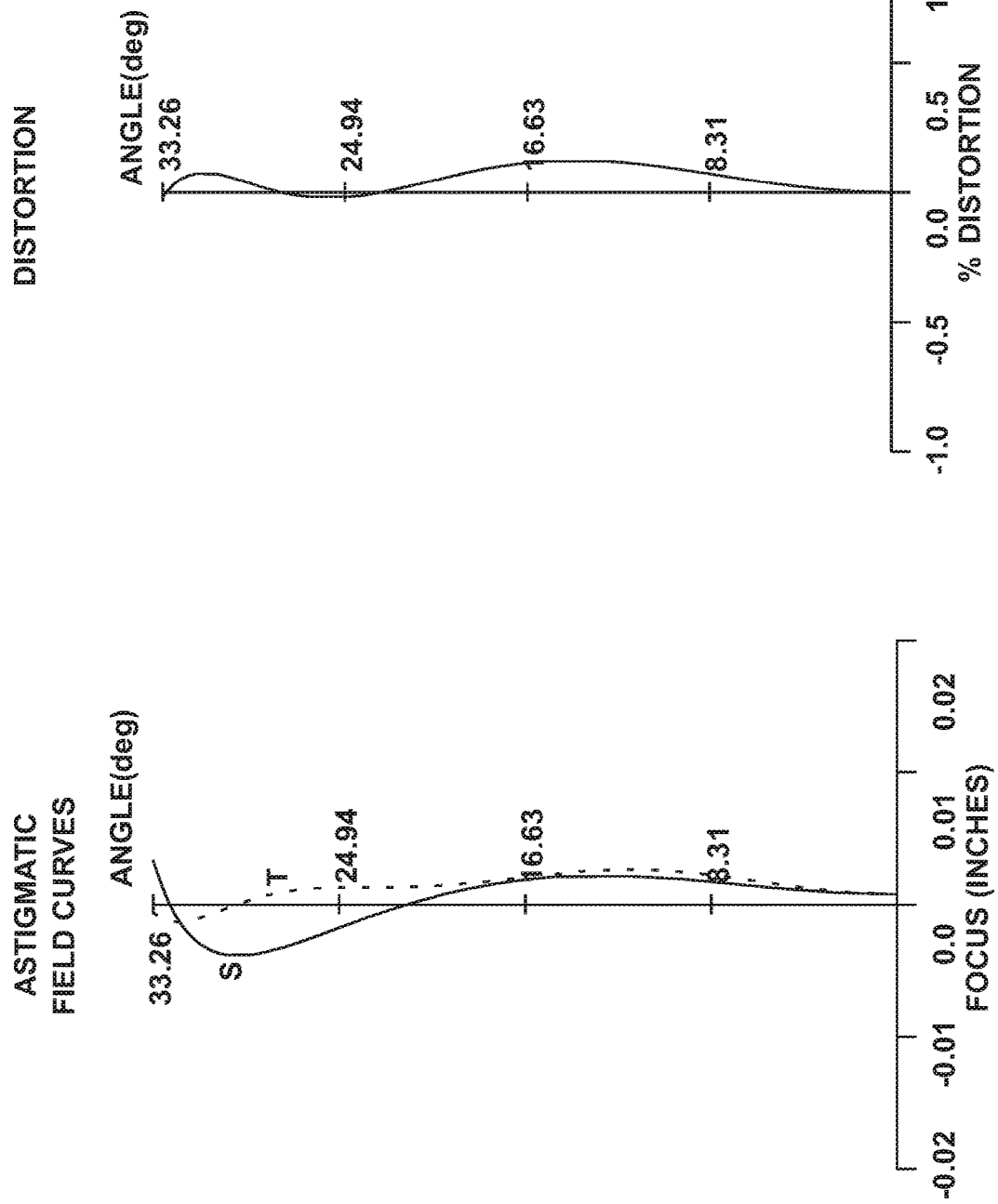

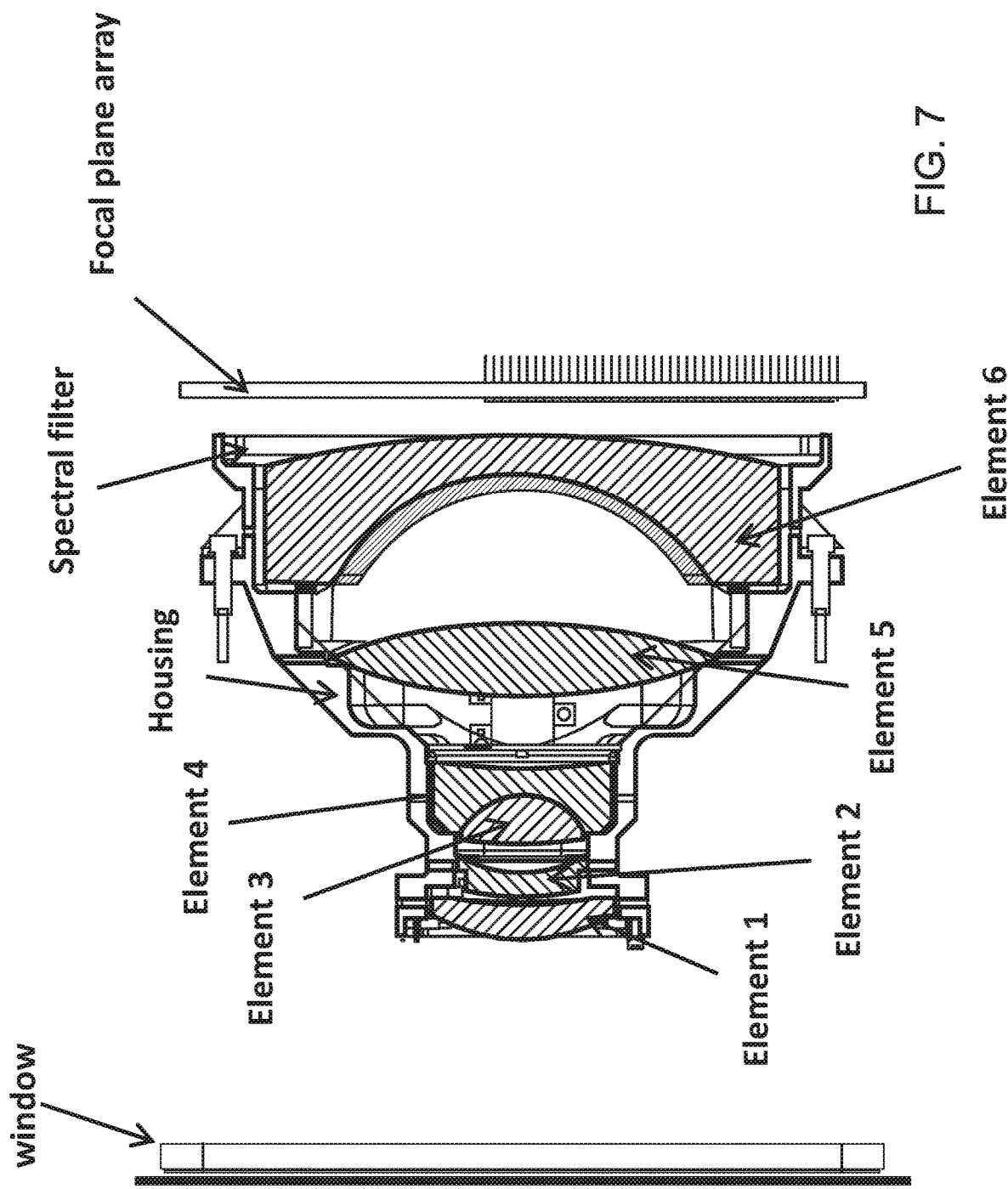

ORTHOSCOPIC PROJECTION LENS

STATEMENT OF GOVERNMENT INTEREST

The present disclosure was developed under Prime Contract No. W15P7T-10-D-D414/KZ02, Sub-Contract No. L102824485, awarded by the United States Army, and the United States Government has certain rights thereto.

FIELD

The present disclosure relates to optical lenses, and more particularly to VNIR (visible and near-infrared) orthoscopic projection lenses.

BACKGROUND

Visible and near infrared (VNIR) imaging systems (systems designed to form images of light in the wavelength range from 500 nm to 950 nm) are deployed on airborne platforms for many, diverse applications, including reconnaissance, surveillance, and mapping.

Special requirements apply to optics that are deployed on airborne platforms, in that they must have a long focal length so as to obtain fine spatial resolution, and should be compact and possess a wide field of view. In addition, the optics must be insensitive to wide fluctuations in temperature, for example from 0 degrees C. to 40 degrees C. Also, airborne optical systems are typically called upon to obtain and store very large quantities of high resolution images, such that extensive post-acquisition processing of the images is avoided.

It can also be important to correct an airborne VNIR optical lens for as many imperfections as possible, so as to optimize the resulting images, and limit or eliminate any need for post-processing. In particular, it is also important to limit or eliminate optical distortion.

When using a lens to image a remote scene or object from an optical platform, even when all other aberrations of the lens except distortion have been corrected, light from at least some points on the object might be focused on the image plane at an incorrect distance from the optical axis, whereby the distances from the optical axis to imaged features of the object are not linearly proportional to the dimensions of the object. In particular, if the distances between projected points of the image increase faster than between the corresponding points of the object, so-called "pincushion" distortion occurs, whereas if the opposite occurs, so-called "barrel distortion" occurs.

For distortion correction, the sum of distortions induced by each group of optical elements in the lens should be minimal, based on the design configuration and specification.

The wave front Wd corresponding to optical distortion can be expressed as a Seidel aberration:

$$Wd = K\alpha^3(H)\cos\theta \qquad (1)$$

Where K is a distortion coefficient, α is the field angle, H is the height of the marginal ray at the pupil, and θ is the aperture angle.

Optics used in airborne sensors for mapping, surveillance, and/or identification should provide sufficient light and contrast to resolve fine object structures. The "F-number" (F #) of the lens is defined as the ratio of the paraxial focal length to the pupil diameter. A low F # therefore allows more energy emitted or reflected by the object to be transmitted to the image plane. This feature also leads to a better signal-to-noise ratio in the image. Yet another desirable feature for an airborne survey and mapping imaging system is a wide field of view, so as to enable the system to cover a large area of observation. This is especially important for airborne surveillance sensors, where a very large amount of data must be processed in as short a time as possible.

However, the paraxial F # of the lens changes across the field of view, thereby causing the "real" F # and marginal ray angle θ with respect to the chief ray to also change. Accordingly, enlarging the field of view (FOV) and/or reducing the F # tend to increase the optical distortion. In particular, all of the first, third, and higher order aberrations of a lens are proportional to the focal length of the lens, and inversely proportional to the F #.

For these reasons, among others, existing wide field lenses do not possess a long focal length and typically have a high F #, causing their spatial resolution and amount of light at the image plane to be insufficient. Typically, the residual distortion of such lenses is greater than 1%, rendering precise measurements of target characteristics and location difficult without significant post processing of the image.

For compactness, a telephoto lens configuration is typically used for airborne optical lenses, whereby the lens includes at least one positive optical group of elements and at least one negative optical group of elements, the two optical groups being sometimes referred to as "telephoto" groups. This configuration allows the light path to be extended, creating a long-focus lens having a shorter overall length.

Another required feature for airborne sensor optics is thermal stability of the optics. The environmental conditions in an airborne application depend on climate and altitude, and can have a strong impact on the performance of the optics. Temperature changes occurring to a lens during areal and similar applications can cause the following effects:

changing of the surface radii of the optical elements;
changing of a spherical surface of an optical element to an aspheric surface;
changing of the spacing between the optical elements; and
changing of the refractive indices of the optics of the optical elements.

When designing optics for airborne applications, it is therefore important that the physical structure and the refractive coefficients of the optical element materials be insensitive to large temperature changes and/or that the lens compensated for any changes in the structure and/or refractive coefficients due to temperature changes.

Yet another desirable feature of airborne sensor optics is color correction across a wide wavelength range, preferably across the near IR and visible range (NIRV) of 500 nm to 950 nm.

Therefore, for airborne and other applications, there exists a need in the art for a high performance orthoscopic (low distortion) lens having a long focal length and low F #, and preferably including chromatic correction over the full FIRV wavelength range.

SUMMARY

Presently disclosed is a high performance, orthoscopic (low distortion), telephoto lens system that provides a wide field of view, a long focal length, and a low F #, and is suitable for, but not limited to, visible airborne sensor applications utilizing compact optics where orthoscopic performance is essential for high resolution target imaging. In embodiments, the field of view exceeds 60 degrees, the focal length is more than 3 inches, the F # is 6 or less, and/or the distortion is corrected to better than 0.2% across the field of view. In various embodiments, the lens is apochromatic (insensitive to wavelength) over the NIRV spectrum (500 nm to 950 nm) to less than 7 microns, which in embodiments is less than one pixel of an associated detector. In various embodiment, the thermal image shift (change in the focal length as a function of temperature) is less than the depth of focus over the range 0° C. to 40° C.

In embodiments, the overall length of the lens, as measured from the optical element surface that is closest to the object) to the image plane is 6.5".

The disclosed lens includes five optical groups, i.e. five groups of optical elements. When numbered from the object to the image plane as the first through the fifth optical group, respectively, the first optical group has a positive optical power, the second optical group has a negative optical power, the third optical group has a positive optical power, the fourth optical group has a positive optical power, and the fifth optical group has a negative optical power.

The first optical group includes only one optical element, which has a positive optical power, and is arranged to converge light received from the object and to direct the converged light onto the second optical group.

The second optical group also includes only one optical element, which has a negative optical power, and is arranged to diverge the light from the first optical group and to direct the diverged light onto the third optical group.

The third optical group has a positive optical power and includes two optical elements having, in order from the object to the image plane, a positive and a negative optical power respectively. The third optical group is arranged to converge the light from the second optical group and to direct it onto the fourth optical group.

The fourth optical group includes only one optical element, which has a positive optical power, and is arranged to converge the light from the third optical group and to direct it to the fifth optical group.

The fifth optical group includes only one optical element, which has a negative optical power, and is arranged to direct the light from the fourth optical group onto the image plane.

In embodiments, an aperture stop is positioned between the second and third optical groups. The optical powers and shape of the components, Abbe dispersion values (variability of refractive index with wavelength) and the changes of the refractive coefficients of the optical materials with temperature are selected such that the lens system is athermalized over a wide range of temperatures, which in embodiments is from 0° C. to 40° C. The disclosed lens system is orthoscopic and monochromatic, and chromatic aberrations are also corrected.

The present disclosure is an orthoscopic lens configured to form an image of an object on an image plane. The lens includes, in order from the object to the image plane:
  a first optical group having a positive optical power;
  a second optical group having a negative optical power;
  a third optical group having a positive optical power;
  a fourth optical group having a positive optical power; and
  a fifth optical group having a negative optical power.

The lens further includes an aperture stop positioned between said second and third optical groups. A residual distortion of said lens does not exceed 0.2% over a full field of view of more than 60°, the lens is apochromatic over a spectral range of 500 nm to 950 nm to less than 7 microns, the lens has an F # of less than 6.5, and the lens has an overall length of less than 7 inches as measured from a first surface of the first optical element to said image plane.

In embodiments, the focal length of the lens does not change as a function of temperature by more than 0.0015 inches within a temperature range of 0° C.-40° C.

In any of the above embodiments, the optical groups can include optical elements made from at least six different types of optical glasses.

In any of the above embodiments, the first optical group can include exactly one optical element having a positive optical power, and being arranged to converge light received from the object and to direct the diverged light onto said second optical group. In some of these embodiments, the single optical element of said first optical group is shaped as a positive meniscus whose concave surface faces toward said image plane. And in some of these embodiments, the first surface of the single optical element of the first optical group is formed aspherical. In any of these embodiments, the single optical element of the first optical group can be made out of Schott glass NLAK12.

In any of the above embodiments, the second optical group can include exactly one optical element having a negative optical power, and being arranged to diverge light received from the first optical group and to direct the diverged light onto said third optical group. In some of these embodiments, the optical element is shaped as a negative meniscus whose concave surface faces toward said image plane. In any of these embodiments, the single optical element of the second optical group can be made out of Schott glass NLAF2.

In any of the above embodiments, the third optical group can include exactly two optical elements, being a first optical element of the third optical group and a second optical element of the third optical group, wherein the first optical element of the third optical group closer to the object than the second optical element of the third optical group, and wherein the first optical element of the third optical group has a positive optical power, and the second optical element of the third optical group has a negative optical power, the third optical group being arranged to converge the light from said second optical group and to direct the converged light onto the fourth optical group.

In some of these embodiments, the first optical element of the third optical group is shaped as a double convex lens, and the second optical element of the third optical group is shaped as a double concave lens. In any of these embodiments, the first and second optical elements of the third optical group can be cemented together into a doublet. And in any of these embodiments, the first optical element of the third optical group can be made out of Schott glass NLAK22, and the second optical element of the third optical group can be made out of Schott glass NKZFS11.

In any of the above embodiments, the fourth optical group can include exactly one optical element having a positive optical power, and being arranged to converge light received from said third optical group and to direct the converged light onto said fifth optical group. In some of these embodiments, the optical element of the fourth optical group is shaped as a double convex lens. In any of these embodiments, the optical element of the fourth optical group can be bounded by a first surface and a second surface, said first surface being closer to the object than said second surface, said second surface being formed aspherical. And in any of these embodiments, the optical element of the fourth optical group can be made out of Schott glass NLAF33.

In any of the above embodiments, the fifth optical group can include exactly one optical element having a negative optical power, and being arranged to converge light received from said fourth optical group and to direct the diverged light onto said image plane. In some of these embodiments, the optical element of the fifth optical group is shaped as a negative meniscus whose concave surface faces toward said object. In any of these embodiments, the optical element of the fifth optical group can be bounded by a first surface and a second surface, said first surface being closer to the object than said second surface, said second surface being formed aspherical. And in any of these embodiments, the optical element of the fifth optical group can be made out of OHARA glass SBAH28.

In any of the above embodiments, the following relationships can be satisfied:

$$0.9 < F'10/F'1 < 1.25;$$

$$-1.15 < F'10/F'20 < -0.9;$$

$$0.45 < F'10/F'30 < 0.65;$$

$$0.95 < F'10/F'40 < 1.25; \text{ and}$$

$$-1.65 < F'10/F'50 < -1.35;$$

where F'1 is the focal length of the lens, and F'10, F'20, F'30, F'40 and F'50 are the focal lengths of the first, the second, third, fourth and fifth optical groups respectively.

In any of the above embodiments, the following statements can apply:
the first optical group includes exactly one optical element, which is numbered as element 11;
the second optical group includes exactly one optical element, which is numbered as element 21;
the third optical group includes exactly two optical elements, which are numbered elements 31 and 32, element 31 being closer to the object than element 32;
the fourth optical group includes exactly one optical element, which is numbered as element 41;
the fifth optical group includes exactly one optical element, which is numbered as element 51; and, for the wave length 587.5618 nm;
and the following relationships can be satisfied:

$$-0.80 < F'31/F'32 < -0.60;$$

$$0.90 < F'10/OAL < 1.10;$$

$$0.85 < n11/n21 < 1.10;$$

$$0.75 < n11/n31 < 1.25;$$

$$0.95 < n31/n32 < 1.15;$$

$$1.05 < n11/n41 < 1.30;$$

$$1.35 < n11/n51 < 1.65;$$

$$1.15 < V11/V21 < 1.35;$$

$$1.3 < V31/V32 < 1.45;$$

$$1.20 < V11/V41 < 1.40; \text{ and}$$

$$-0.95 < V11/V51 < 1.15;$$

where:
OAL is a length of the lens 1 from the image plane to a surface of element 11 that is closest to the object, n11 is the refractive index of element 11, n21 is the refractive index of element 21, n31 is the refractive index of element 31, n32 is the refractive index of element 32, n41 is the refractive index of element 41, n51 is the refractive index of element 51, V11 is the Abbe number of element 11, V21 is the Abbe number for element 21, V31 is the Abbe number for element 31, V32 is the Abbe number for element 32, V41 is the Abbe number for element 41, and V51 is the Abbe number for element 51.

And in any of the above embodiments, the following relationships can be satisfied:

$$2.25 < (dn/dT)11/(dn/dT)21 < 2.75;$$

$$0.45 < (dn/dT)31/(dn/dT)32 < 0.65;$$

$$-0.5 < (dn/dT)11/(dn/dT)41 < -0.25;$$

$$-0.6 < (dn/dT)11/(dn/dT)51 < -0.3;$$

$$0.85 < CTE11/CTE12 < 1.3;$$

$$0.9 < CTE31/CTE32 < 1.1;$$

$$1.2 < CTE11/CTE41 < 1.6;$$

$$0.8 < CTE11/CTE51 < 1.4; \text{ and}$$

$$-0.35 < CTE11/CTEh < 0.65;$$

where $(dn/dT)11$, $(dn/dT)21$, $(dn/dT)31$, $(dn/dT)32$, $(dn/dT)41$ and $(dn/dT)51$ are the changes of the refractive indices with temperature of elements 11, 21, 31, 32, 41, and 51, respectively, CTE11, CTE21, CTE31, CTE32, CTE41 and CTE51 are coefficients of thermal expansion of elements 11, 21, 31, 32, 41, and 51, respectively; and CTEh is a coefficient of thermal expansion of a lens mechanical housing that holds and positions elements 11, 21, 31, 32, 41, and 51 in the lens.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIGS. 4A and 4B document the astigmatism and distortion correction of the lens of FIG. 2 across the field of view;
FIG. 7 is an isometric view of the lens of FIG. 2 shown in a housing.

DETAILED DESCRIPTION

Figure 1:
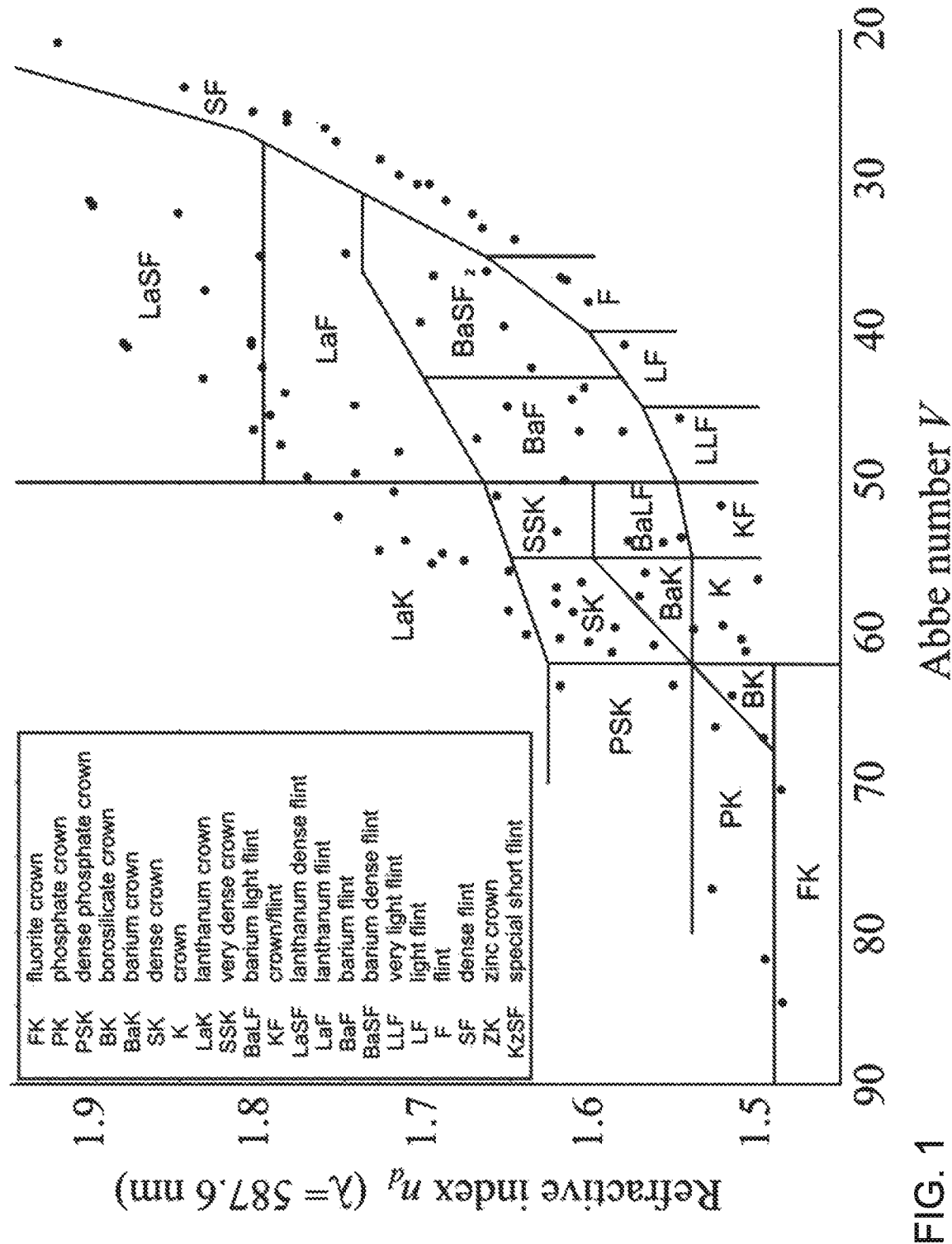
FIG. 1 depicts Abbe numbers and relative partial dispersions for Schott glasses.

The following discussion includes a description of the disclosed orthoscopic lens in embodiments of the present disclosure, which are illustrated in the accompanying figures.

The disclosed orthoscopic lens in this embodiment includes the following features:
- the lens is orthoscopic, in that distortions are corrected to better than 0.2% across the field of view;
- the lens is athermalized, in that the thermal image shift is less than the depth of focus;
- the lens provides a wide field of view, which in exceeds 60 degrees; and
- the lens is apochromatic over the full visible spectrum to less than 7 microns, which in embodiments is less than one pixel.

Below are the specifications for an embodiment of the disclosed lens and an associated detector:

TABLE 1

Specification for an embodiment of the disclosed lens and associated detector

| Parameter | | | | | | | | | | |
|---|---|---|---|---|---|---|---|---|---|---|
| Focal Length | 5.10 inches (+/− 0.5%) | | | | | | | | | |
| Horizontal Full Field of View | 66.52 degrees (Mid-Overlap) | | | | | | | | | |
| Scan Full Field of View | 66.11 degrees | | | | | | | | | |
| F number | F/6.0 | | | | | | | | | |
| Spectral Band | 500-950 nm | | | | | | | | | |
| Spectral Weighting | 500 nm | 550 nm | 600 nm | 650 nm | 700 nm | 750nm | 800 nm | 850 nm | 900 nm | 950 nm |
|  | 14 | 29 | 48 | 73 | 80 | 92 | 91 | 78 | 50 | 1 |
| Number Pixels X and Y | 24,274 × 128 (Mid-Overlap) | | | | | | | | | |
| Pixel Pitch | 7.0 microns | | | | | | | | | |
| Transmission vs. Wavelength | 75 percent average, 60 percent minimum (lens only) | | | | | | | | | |
| Distortion | ≤0.2% | | | | | | | | | |
| Optical MTF (Design) Minimum both red and Tan 25% Full Field/50% Full Field | 18 lp/mm 0.80/0.75 | | 36 lp/mm 0.70/0.65 | | | 54 lp/mm 0.50/0.45 | | | 72 lp/mm 0.40/0.35 | |
| Operational Environment (Temperature/Vibration/Altitude) | Temp 0°-40° C. Vibration as in Twin Otter Aircraft (TBR Altitude 15-18 Kft | | | | | | | | | |
| Physical volume | Overall length less than 6.5 inches | | | | | | | | | |
| Weight | No requirement | | | | | | | | | |
| Focal Plane Interface | 6.690" × 0.800" format 1 mm sapphire window 0.0158" above detector 3 mm GG495 filter 0.120" above sapphire window | | | | | | | | | |

The disclosed lens provides a truly undistorted image of the target and simplifies the scanning process, because the variation of focal length across the field is minimized.

As noted above, temperature changes occurring to a lens during areal and similar applications can cause the following effects:
- changing of the surface radii of the optical elements;
- changing of a spherical surface of an optical element to an aspheric surface;
- changing of the spacing between the optical elements; and
- changing of the refractive indices of the optics of the optical elements.

The magnitudes of the temperature effects are controlled by the coefficients $\alpha$ and $\beta$, where $\alpha$ is the linear coefficient of thermal expansion (CTE) and is defined as:

$$\alpha = \frac{1}{L}\left(\frac{dL}{dT}\right) \quad (2)$$

and $\beta$ is the thermal coefficient of the refractive index, and is defined as:

$$\beta = \frac{dN}{dT} \quad (3)$$

where L is the original element thickness, N is the optical material refractive index at normal (usually +20° C.) temperature, T is the original temperature.

The magnitude of these coefficients $\alpha$ and $\beta$ determines the sensitivity of the optical system to a change in temperature. Different material types have different $\alpha$ and $\beta$ coefficients, and result in different performance impacts.

The athermalized lens systems of the present disclosure have a very low sensitivity to temperature changes, such that the performance of the lens does not change significantly with temperature. In particular, any changes of the focal length of the lens over a temperature range of 0° C. to 40° C. lie within the depth of focus of the optical system.

The athermalization of the disclosed lens is accomplished by careful selection of the lens optical element materials, such that the optical elements of the lens are combined in a way that renders the lens insensitive to changes in temperature. No moving parts are employed by the disclosed lens, but instead very careful attention is paid to the selection of the types of glass that are used and the material that is used to manufacture the mechanical spacers of the housing in which the optical elements are installed. Embodiments of the present disclosure make use of glasses, such as Fluor Crown™ (FK) and Phosphate Crown™ (PK) glass from Schott and OHARA, that are specifically manufactured to have small or negative β values The refractive index n of an optical element is not uniform across the visible spectrum, but instead depends on the wavelength of the light. The degree of the variation of the refractive index with wavelength is represented by the so-called "Abbe" value (Ve) for a given type of glass. Specifically, $$V_e = (n_e - 1)/(n_{F'} - n_{C'}) \quad (4)$$

where $n_e$ is the index of refraction of the glass at the wavelength of the green mercury line e (546.074 nm), nF' is the index at the blue cadmium line F' (479.99 nm), and nC' is the index at the red cadmium line C' (643.85 nm). Accordingly, the smaller the value of Ve, the greater the chromatic dispersion through the glass. FIG. 1 is an Abbe diagram that presents combinations of refractive index and Abbe number for a variety of different types of glass.

The disclosed lens is apochromatic, in that it is designed to bring three wavelengths (in embodiments red, green, and blue) into focus in the same plane. This apochromatic correction is needed so as to achieve good optical performance across the whole VNIR spectrum, whereby as many wavelengths as possible should have the same focal length. So as to provide this apochromatic correction, the optical element glasses are selected that they have special dispersive properties over the entire spectrum of interest. At the same time, the optical powers of the optical elements are arranged in a specific order that takes advantage of the dispersive properties of the optical elements.

For an athermal and chromatically corrected lens, the focal length change and all monochromatic and chromatic aberrations changes are functions of:
optical element material properties such as temperature dependence of the refractive index and dispersion; and
temperature expansion coefficients of the glasses and the spacers that position the optical elements within the housing.
Of these, the temperature dependence of the refractive index has the most significant effect on lens performance.

The F # of a lens determines the resolution of the optics, along with the amount of light that is delivered to the image plane. As an example, the increase in the amount of light delivered by a projection lens having F #6 as compare to the amount of light delivered by a lens having F #7.4 is 1.52 times. As such, the F # affects the signal/noise ratio of the lens. However, reducing the F # makes it more difficult to correct optical aberrations, especially spherical aberration and coma.

For certain applications, such as for areal observation of ground targets, a wide field of view is required to allow simultaneous observation of a large area. However, increasing the field of view makes it more difficult to correct astigmatism, field curvature and distortion.

The large focal length of the disclosed lens provides a large image plane, which allows the lens to be implemented with large, high resolution detectors. For example, for embodiments having a focal length of 3.23" and field of view of 66° the focal plane size is 2.1" and for the 5.1" focal length the focal plane size is 3.3".

Embodiments of the presently disclosed lens are suitable for remote airborne optical sensing, and can be used across a wide range of temperatures in military and civilian applications. Embodiments are athermalized and orthoscopic wide angle lenses that sustain optical performance through the full visible spectrum, and in embodiments across the full VNIR spectrum from 500 nm to 950 nm.

For some embodiments, the optical powers and shapes of the optical elements, the Abbe dispersion values of the optical elements, and the temperature dependence of the refractive indices of the optical materials from which the optical elements are manufactured, are all selected such that the lens system is athermalized over a wide range of temperatures, from 0° C. to 40° C. And for some of these embodiments, within this temperature range, residual distortion is less than 0.2%, and the change of the focal length through the temperature range is less than the depth of focus of the lens. Embodiments provide a long focal length, for example greater than 3 inches, with low F #, for example 6 or less, to provide the necessary amount of light at the image plane. Also, the disclosed lens is orthoscopic while possessing a wide field of view, which in embodiments is more than 60°.

For example, athermalized orthoscopic embodiments of the disclosed lens have an F # that is equal to or less than 6, with distortion not exceeding 0.2%. Some of these embodiments are corrected for monochromatic aberrations and include apochromatic correction over the NIRV spectrum of 500 nm to 950 nm. Embodiments provide a field of view of as much as 66.52 degrees. And embodiments of the disclosed lens have an effective focal length of more than 5.1 inches (with F #6 or less).

In embodiments, the overall length of the lens, as measured from the optical element surface that is closest to the object) to the image plane is 6.5".

The disclosed orthoscopic projection lens includes, in order from the object to the image plane, a first optical group having a positive optical power; a second optical group having a negative optical power; a third optical group having a positive optical power; a fourth optical group with a positive optical power; and a fifth optical group having a negative optical power. In embodiments, an aperture stop is positioned between the second and third optical groups.

The first optical group is arranged to converge light received from the object and to direct the converged light onto the second optical group. The second optical group is arranged to diverge the light from the first optical group and to direct the diverged light onto the third optical group. The third optical group is arranged to converge the light from the second optical group and to direct it onto the fourth optical group. The fourth optical group is arranged to converge the light from the third optical group and direct it to the fifth optical group, and the fifth optical group is arranged to diverge the light from the fourth optical group and to direct the diverged light onto the image plane.

Figure 2:
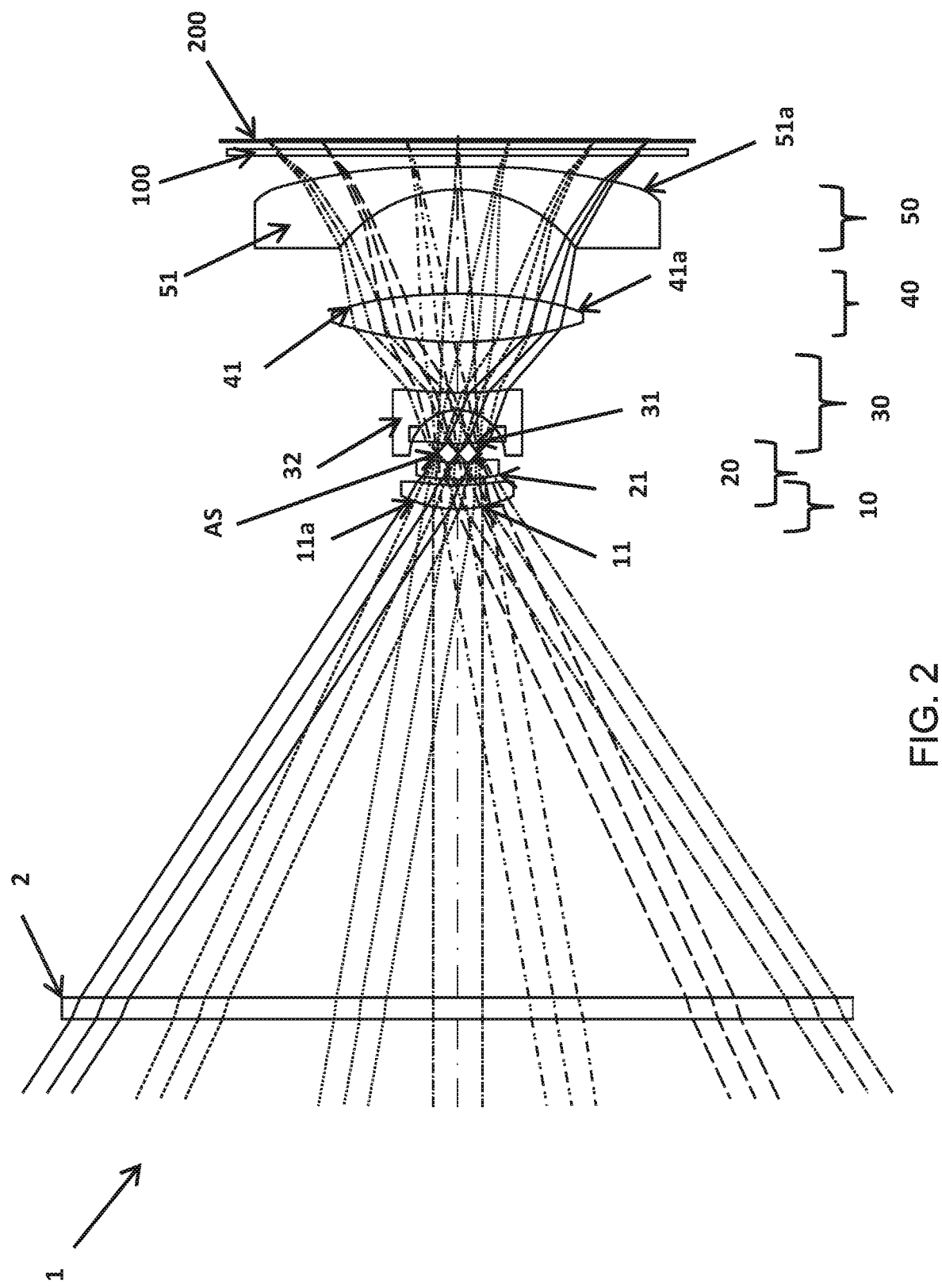
FIG. 2 is a side cross-sectional view of a lens configured in accordance with an embodiment of the present disclosure.

FIG. 2 is a side cross-sectional illustration of an orthoscopic projection lens according to an embodiment of the disclosure. The lens 1 includes an entry window 2, a first optical group 10, a second optical group 20, a third optical group 30, a fourth optical group 40, a fifth optical group 50, a color filter 100 and a detector 200 located at a focal plane. An aperture stop AS is positioned between the second 20 and third 30 optical groups. The lens 1 is configured to form an image of a remote object onto the detector 200, which may comprise a focal plane array with CCD or CMOS detection.

Specifications for the lens of FIG. 2 are as follows:
EFL: 5.1 inches
WL: 500 nm-950 nm
F #: 6
FOV: 66.52°
OAL: 6.5 inches
Distortion: <0.2% cross field
Lateral color: corrected
Where EFL is the effective focal length of the lens; WL is the wavelength range over which the lens is chromatically corrected; F # is the "F-number" of the lens; FOV is the field of view of the lens; and OAL is the overall length of the lens, as measured from the optical element surface 11a that is closest the object to the image plane.

In the embodiment of FIG. 2, the first optical group 10 includes one optical element 11, which has a positive optical power. The first optical group 10 is arranged to converge light received from the object (not shown) and to direct the converged light onto the second optical group 20. Optical element 11 is made in a form of a positive meniscus whose concave surface (opposite to 11a) faces toward the image plane 200. The first surface 11a of the single optical element 11 in the first optical group 10 is formed aspherical in order to correct low and high order spherical aberration. The optical element 11 in the embodiment of FIG. 2 is made out of Schott glass NLAK12.

The second optical group 20 in FIG. 2 also includes only one optical element 21, which has a negative optical power. The second optical group 20 is arranged to diverge the light from the first optical group 10 and to direct the diverged light onto the third optical group 30. Optical element 21 is made in a form of a negative meniscus whose concave surface faces toward the image. Element 21 is made from Schott glass NLAF2.

The third optical group 30 in FIG. 2 has a positive optical power and includes two optical elements 31 and 32 having, in order from the object toward the image plane, a positive and a negative optical power, and which are arranged to converge the light from the second optical group 20 and to direct it onto the fourth optical group 40. Optical element 31 is made in the form of a double convex lens, and element 32 is made in the form of a double concave lens. Optical elements 31 and 32 are cemented together into a doublet so as to correct for secondary color, which is a difference between the image positions for the short, middle, and long wave lengths. The indices of refraction and coefficients of thermal expansion for optical elements 31 and 32 closely matched to each other, so as to prevent distortion of the doublet surfaces across a wide range of temperatures. The materials out of which optical element 31 and 32 are made are Schott glasses NLAK22 and NKZFS11 respectively, so as to obtain the necessary ratio of optical dispersions.

The fourth optical group 40 includes only one optical element 41, which has a positive optical power and is arranged to converge the light from the third optical group 30 onto the fifth optical group 50. Optical element 41 is made in a form of a double convex lens having a second surface 41a that is aspherical, so as to correct the lens for coma and residual high order spherical aberration. Optical element 41 is made out of Schott glass NLAF33.

The fifth optical group 50 also includes only one optical element 51, which has a negative optical power and is configured to direct light from the fourth optical group through the filter 100 and onto the detector 200 at the image plane. Optical element 51 is made in the form of a negative meniscus, whose concave surface faces toward the object. The second surface 51a of optical element 51 is formed aspherical so as to correct the lens for astigmatism and distortion. Optical element 51 is made out of OHARA glass SBAH28.

The combination of the optical powers of the optical groups in the embodiment of FIG. 2 provides a flat and undistorted image at the image plane.

The aperture stop AS in the embodiment of FIG. 2 is positioned between the second 20 and third 30 optical groups. In the embodiment of FIG. 2, the optical powers and shapes of the optical elements, the Abbe dispersion values and the temperature changes of the refractive coefficients of the optical materials are all selected so that the projection lens 1 is athermalized from 0° C. to 40° C. The lens is orthoscopic and monochromatic and chromatic aberrations are corrected The following relations among the optical groups 1, 2, 3, 4 and 5 and their constituent optical elements have been found to achieve monochromatic and apochromatic aberrational correction across the field of view at least 66.52°.

$0.9 < F'10/F'1 < 1.25$ $-1.15 < F'10/F'20 < -0.9$ $0.45 < F'10/F'30 < 0.65$ $0.95 < F'10/F'40 < 1.25$ $-1.65 < F'10/F'50 < -1.35$ $-0.80 < F'31/F'32 < -0.60$ $0.90 < F'10/OAL < 1.10$ $0.85 < n11/n21 < 1.10$ $0.75 < n11/n31 < 1.25$ $0.95 < n31/n32 < 1.15$ $1.05 < n11/n41 < 1.30$ $1.35 < n11/n51 < 1.65$ $1.15 < V11/V21 < 1.35$ $1.3 < V31/V32 < 1.45$ $1.20 < V11/V41 < 1.40$ $0.95 < V11/V51 < 1.15$

Wherein:
F'1 is the focal length of the lens 1;
F'10, F'20, F'30, F'40 and F'50 are the focal lengths of the first, the second, third, fourth and fifth optical groups 10, 20, 30, 40 and 50 correspondingly;
OAL is the length of the lens 1 from the first surface of the first element to the image plane;
n11 is the refractive index for element 11 of first optical group 10;
n21 is the refractive index for element 21 of second optical group 20;
n31 is the refractive index for first element 31 of third optical group 30;
n32 is refractive index for second element 32 of third optical group 30;
n41 is the refractive index for element 41 of fourth optical group 40;
n51 is the refractive index for element 5 of fifth optical group 50;
V11 is the Abbe number for element 11 of first optical group 10;
V21 is the Abbe number for element 21 of second optical group 20;
V31 is the Abbe number for first element 31 of third optical group 30;
V32 is the Abbe number for second element 32 of third optical group 30;
V41 is the Abbe number for element 41 of fourth optical group 40;
V51 is the Abbe number for element 51 of fifth optical group 50; and All data is given for the wave length 587.5618 nm.

The mutual combination of types of glasses, refractive indices, Abbe numbers, and dispersions of the optical elements of the optical groups 10, 20, 30, 40 and 50 in the embodiment of FIG. 2 allow the lens to achieve a wide field of view, low F #, orthoscopic distortion and apochromatic correction of the lens 1 along with a field curvature correction. Causing the first surface 11a of the optical element 11 of the first optical group 10, the second surface 41a of the optical element 41 of the fourth optical group 40, and the second surface 51a of the optical element 51 of the fifth optical group 50 to be aspherical enables correction of the low and high order spherical aberration, the astigmatism, and the distortion within the spectral range 500 nm-950 nm. The effective focal length of the lens in the embodiment of FIG. 2 is 5.1 inches, the F # is 6, the field of view is 66.52° and the overall length from first surface 11a to image plane 200 is 6.5 inches.

Stability of the lens characteristics across a wide range of temperatures requires a special combination of the dependences of the refractive indices of the optical elements on temperature and also the coefficients of thermal expansion of the optical elements, as well as the housing materials.

In order to make the lens 1 of FIG. 2 stable across a wide range of temperatures, the following relationships between the temperature coefficients of the refractive indices of the optical element materials used in the lens 1 have been determined:

$$2.25 < (dn/dT)11/(dn/dT)21 < 2.75$$

$$0.45 < (dn/dT)31/(dn/dT)32 < 0.65$$

$$-0.5 < (dn/dT)11/(dn/dT)41 < -0.25$$

$$-0.6 < (dn/dT)11/(dn/dT)51 < -0.3$$

$$0.85 < CTE11/CTE12 < 1.3$$

$$0.9 < CTE31/CTE32 < 1.1$$

$$1.2 < CTE11/CTE41 < 1.6$$

$$0.8 < CTE11/CTE51 < 1.4$$

$$0.35 < CTE11/CTEh < 0.65$$

Where:
- $(dn/dT)11$, $(dn/dT)21$, $(dn/dT)31$, $(dn/dT)32$, $(dn/dT)41$, and $(dn/dT)51$ are the changes of the refractive indices due to changes in temperature for the optical elements in the first optical group 10, second optical group 20, third optical group 30, fourth optical group 40, and fifth optical group 50, respectively;
- CTE11, CTE21, CTE31, CTE32, CTE41 and CTE51 are the coefficients of thermal expansion of the materials from which the optical elements are made in the first optical group 10, second optical group 20, third optical group 30, fourth optical group 40, and fifth optical group 50, respectively; and
- CTEh is coefficient of thermal expansion for the lens mechanical housing, where the housing is made out of 316 stainless steel.

These relationships provide a thermally stable lens 1 with an extremely low change of the focal length over a wide range of temperatures.

Figure 3A:
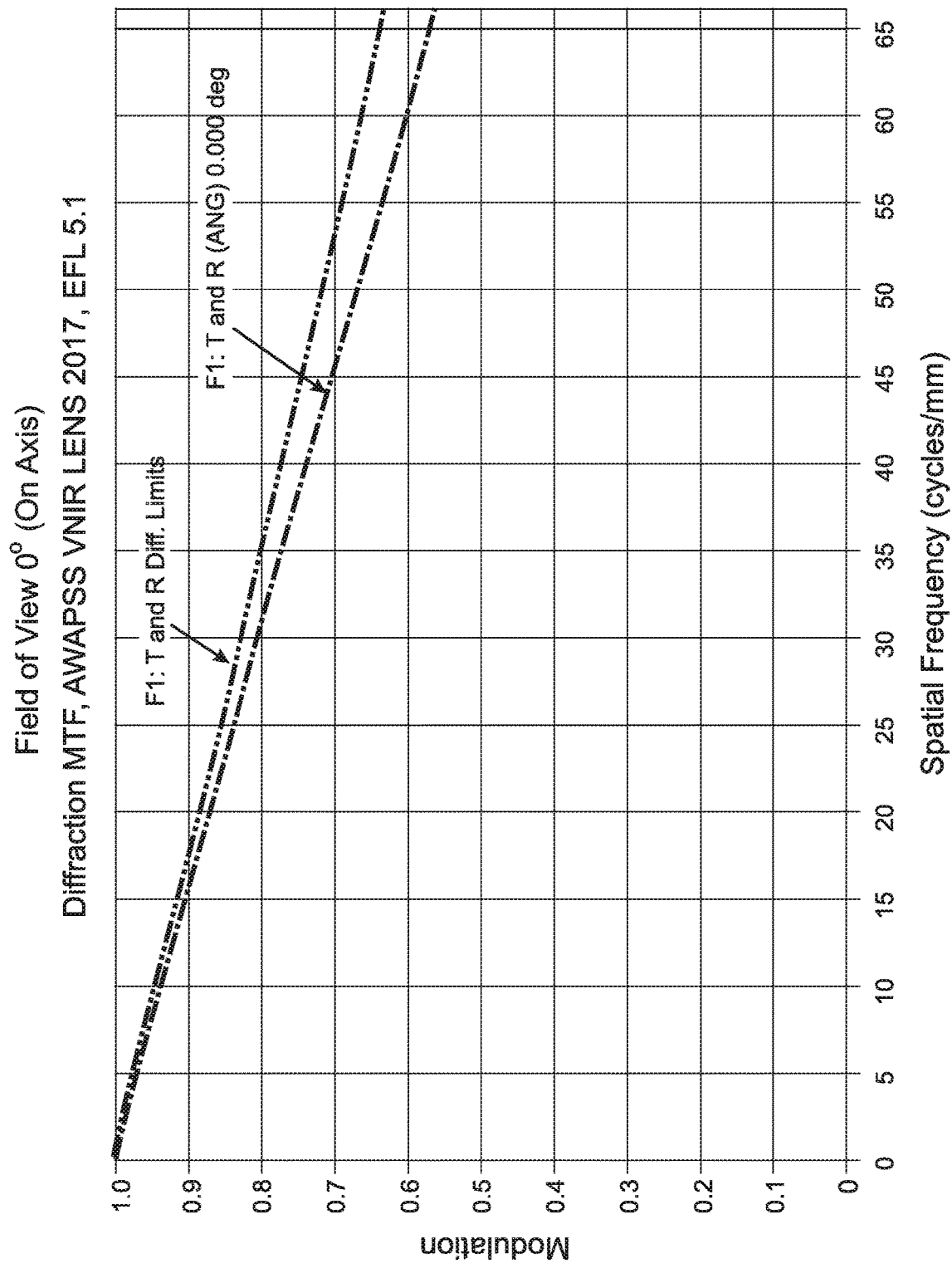
FIGS. 3A-3C present graphs showing a modulation transfer function (MTF) for the lens of FIG. 2.
Figure 3B:
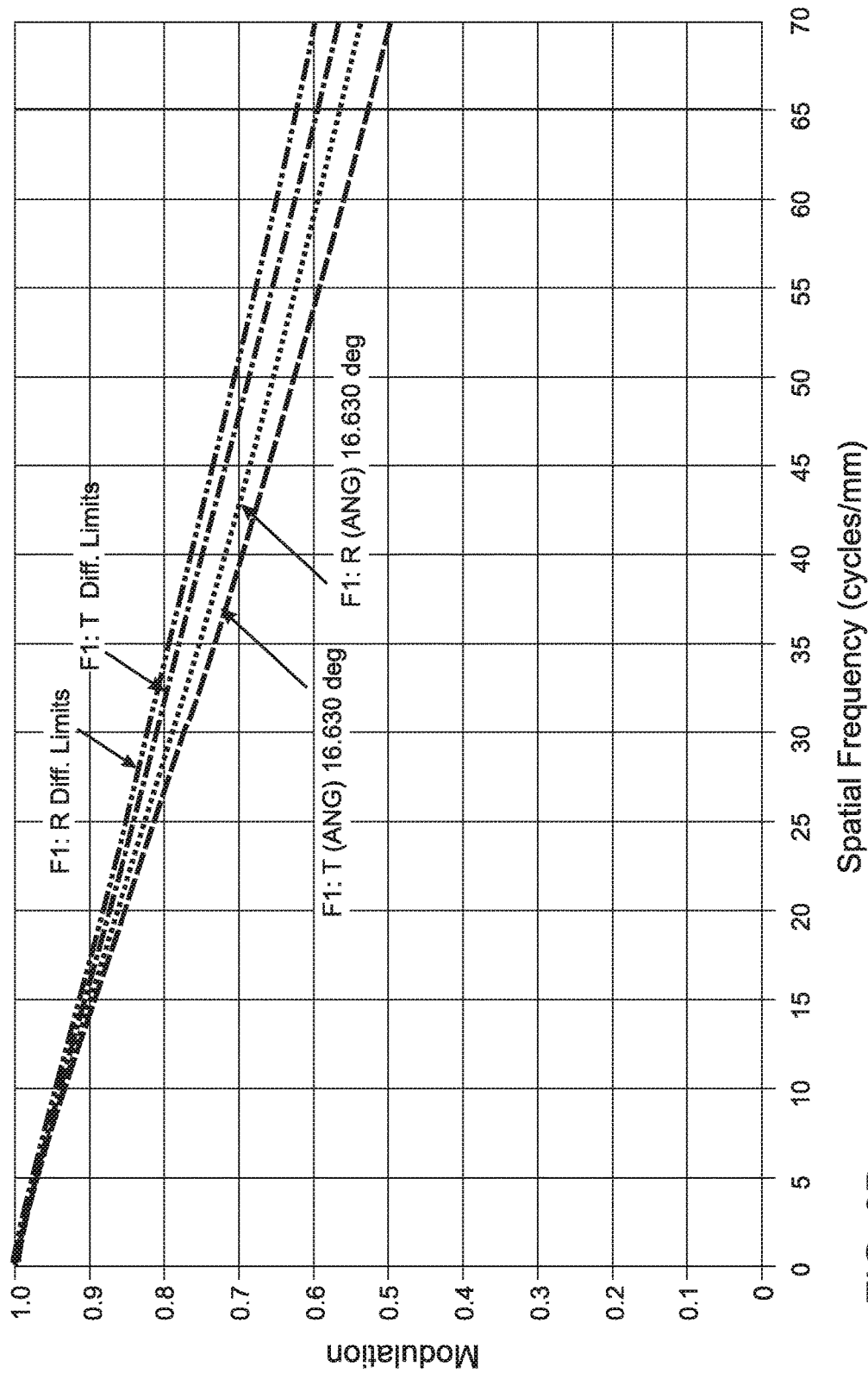
Figure 3C:
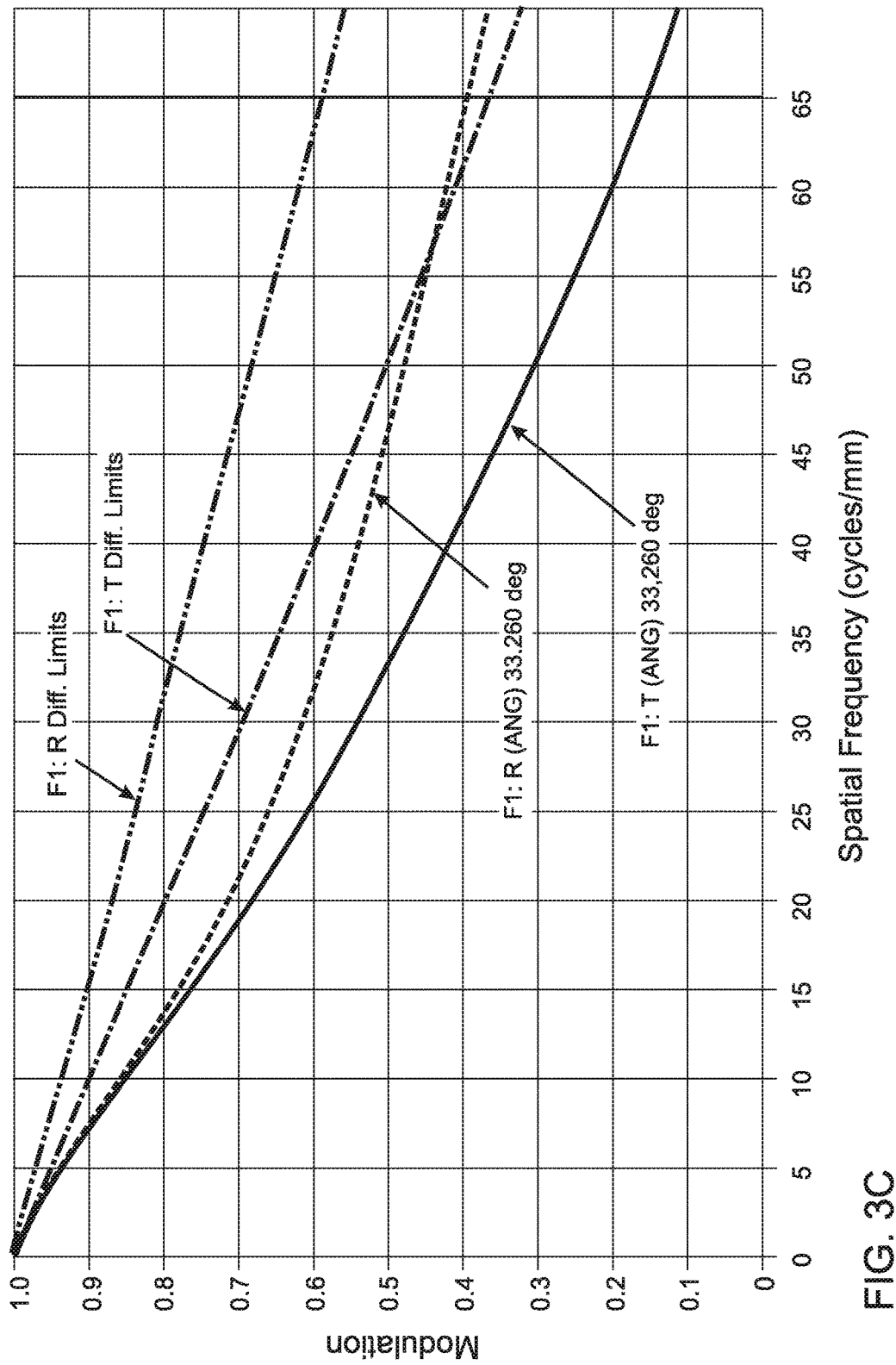

Regarding the remaining figures, FIGS. 3A, 3B, and 3C present MTF data for the embodiment of FIG. 2. FIGS. 4A and 4B present astigmatism and lens distortion data across the field of view for the embodiment of FIG. 2, from which it can be seen that the distortion does not exceed 0.2% for the embodiment.

Figure 5:
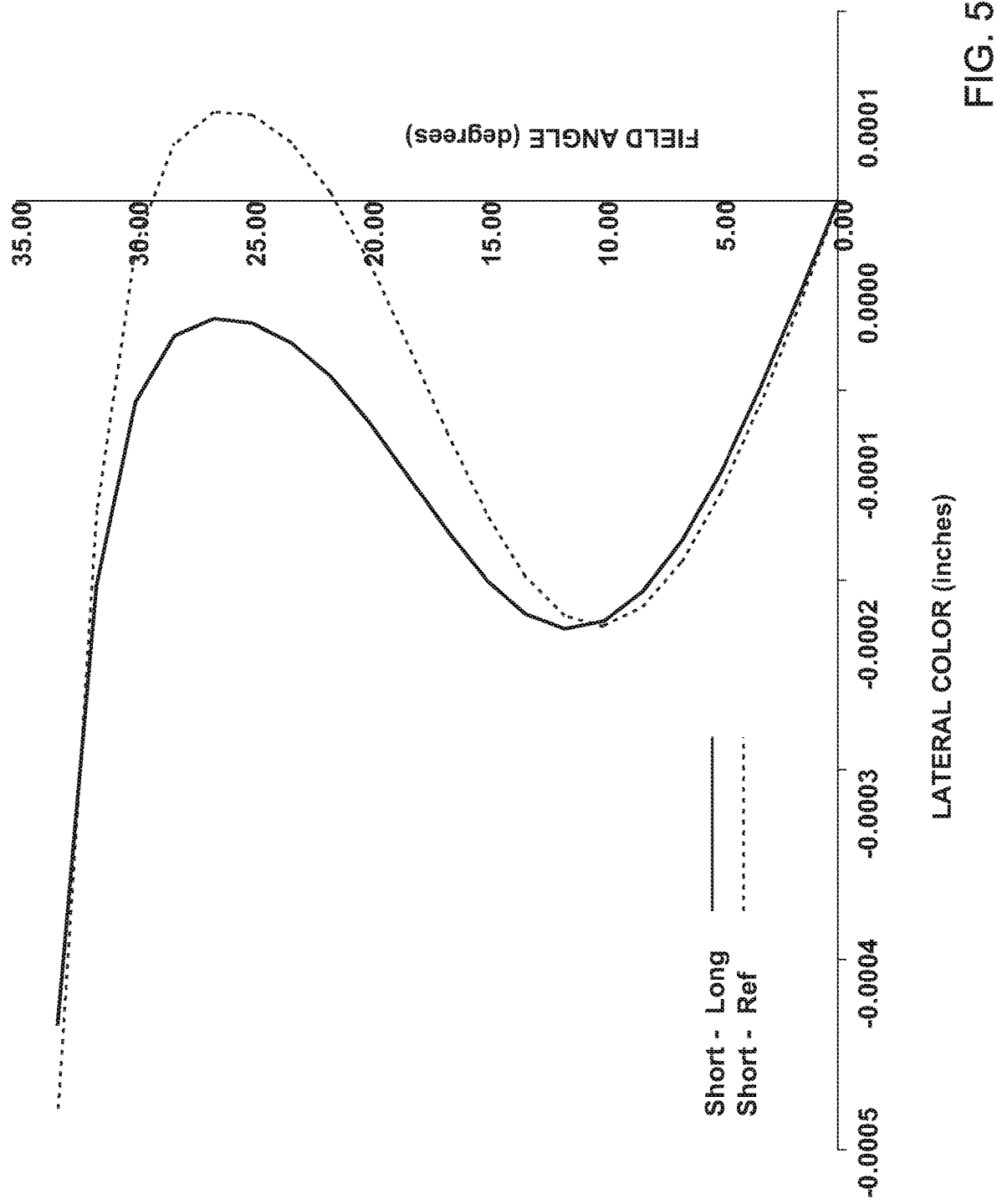
FIG. 5 documents the lateral color correction of the lens of FIG. 2.

FIG. 5 presents a lateral color graph showing apochromatic correction with outer and middle wavelengths intersecting each other for short-ref and short-long wave lengths for the embodiment of FIG. 2.

Figure 6A:
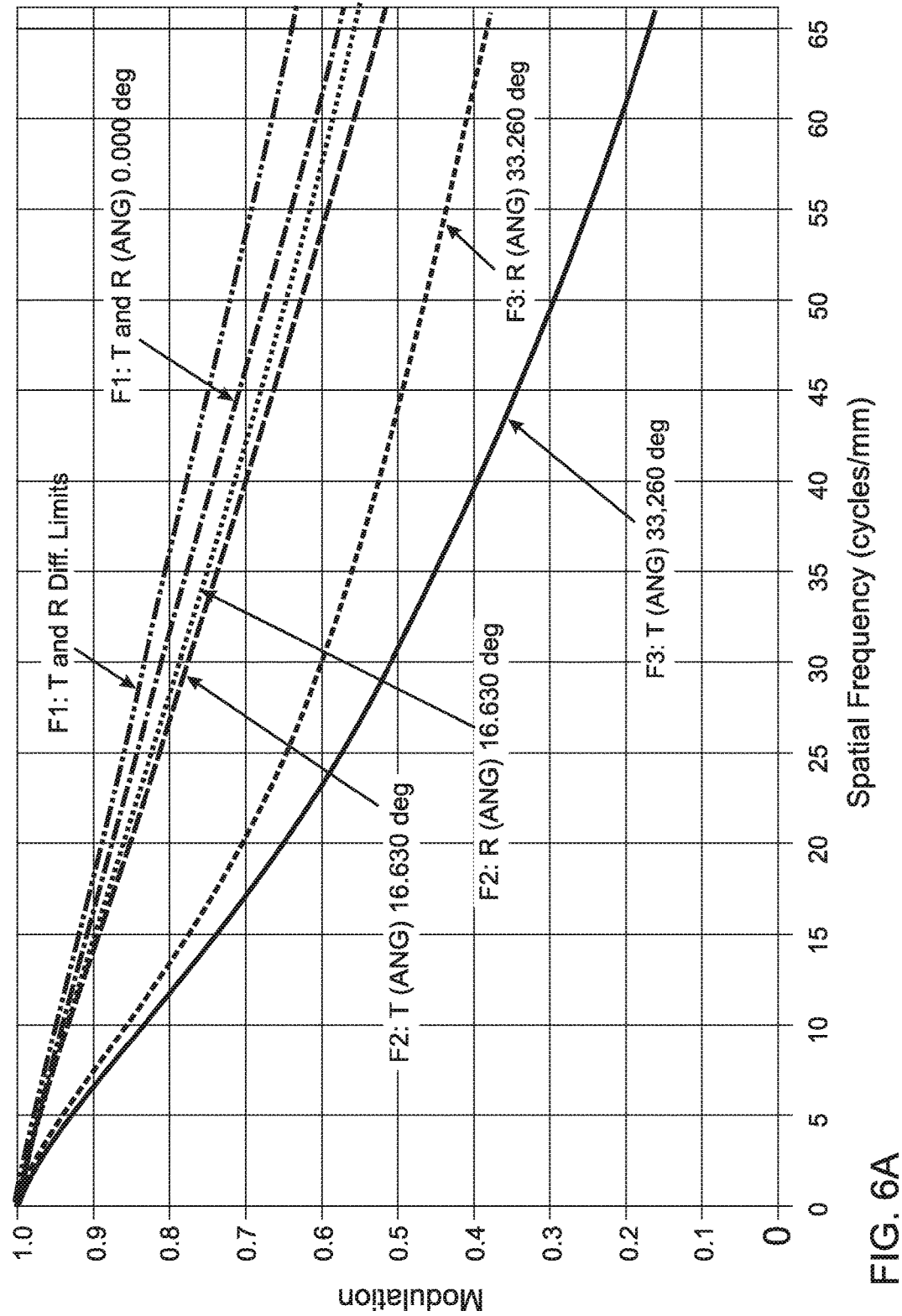
FIGS. 6A-6B present MTF data for the lens of FIG. 2 as a function of altitude and temperature ranges.
Figure 6B:
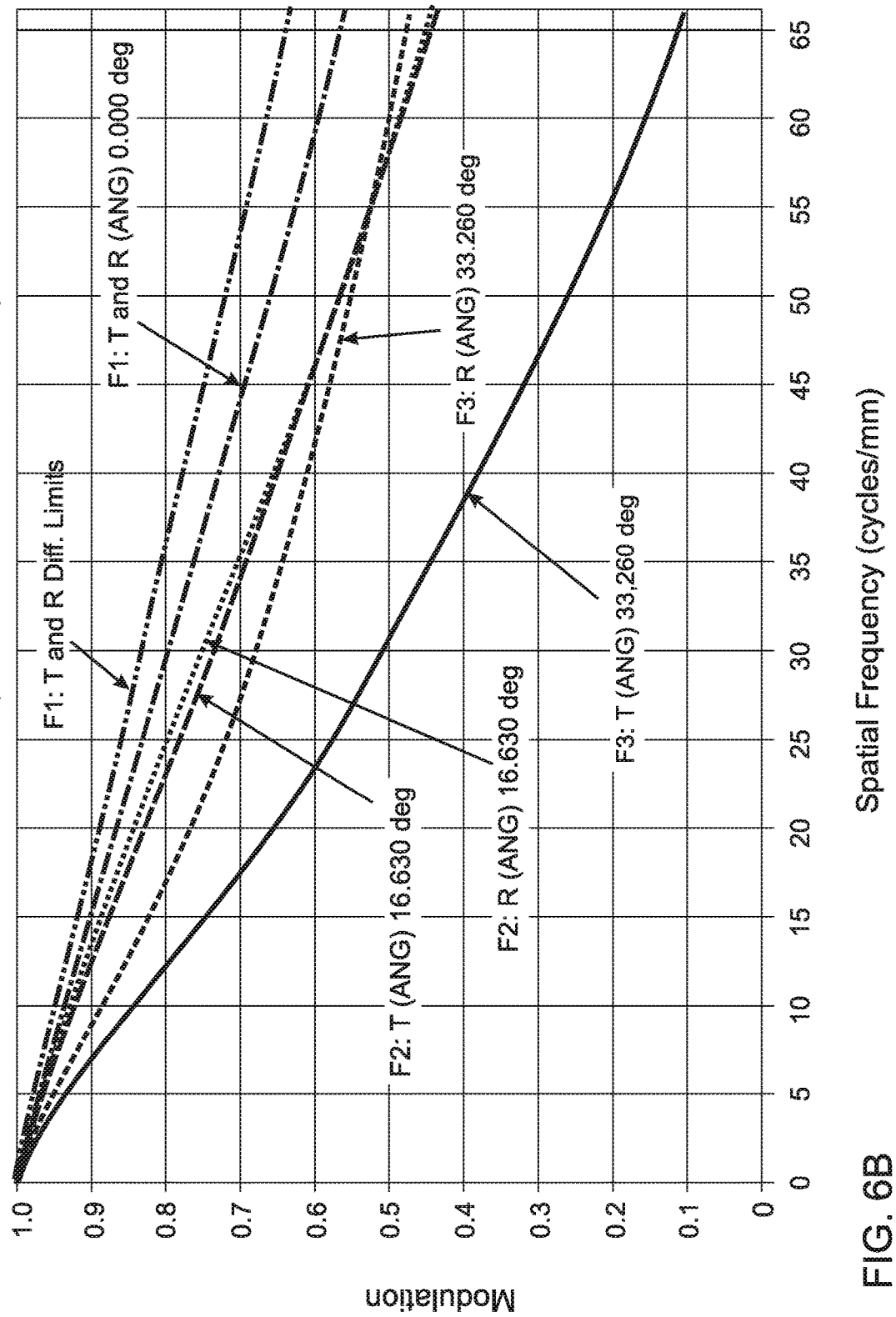

FIGS. 6A and 6B present MTF data as a function of temperature for the embodiment of FIG. 2.

FIG. 7 presents an isometric view of the projection orthoscopic lens of FIG. 2 shown in a housing.

Figure 8:
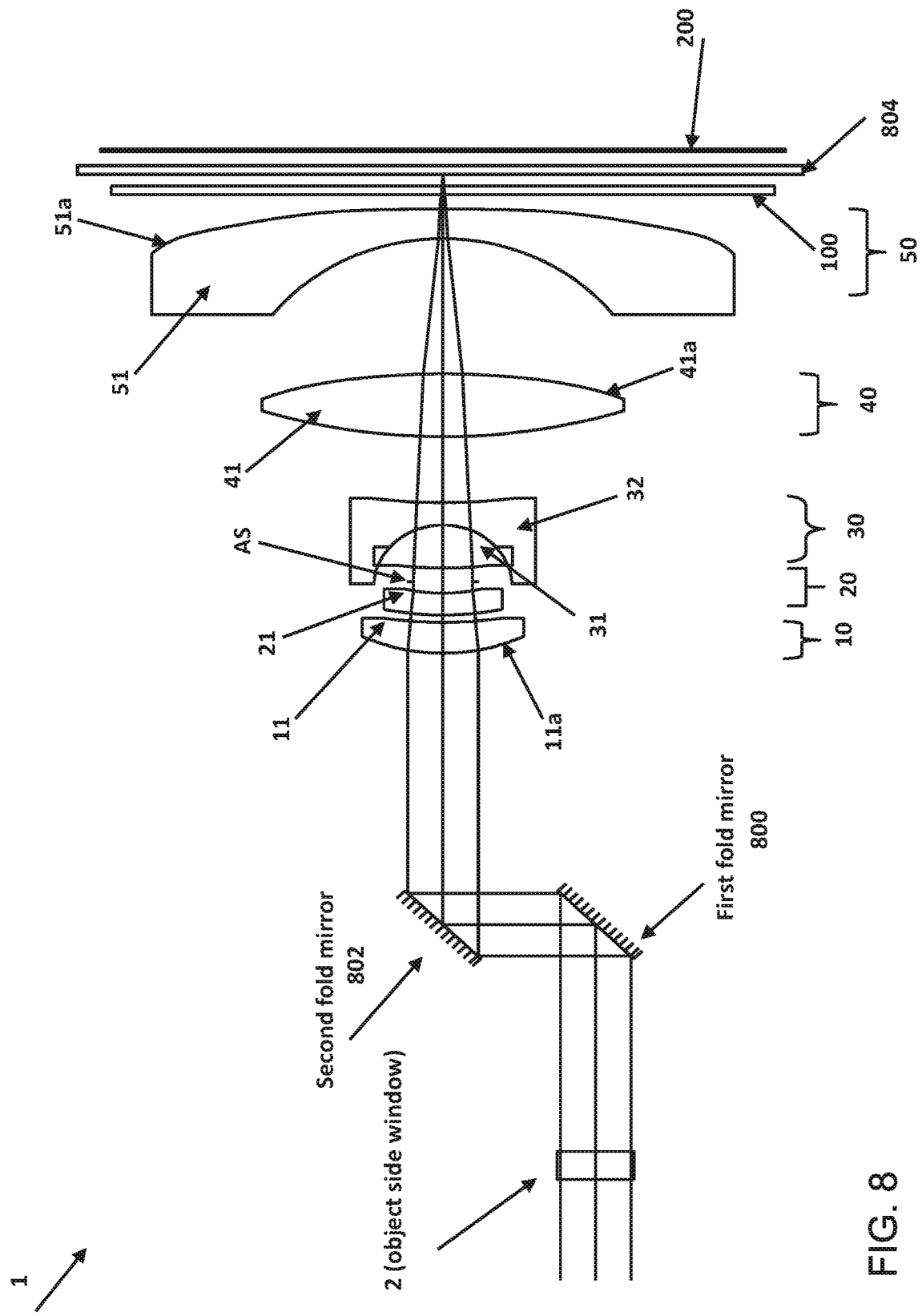
FIG. 8 is a side cross section al view of a lens in an embodiment of the present disclosure that is similar to FIG. 2, but includes two folding mirrors.

And FIG. 8 is a side cross sectional view of an embodiment that is similar to the embodiment of FIG. 2, but includes two folding mirrors 800, 802 that reduce the package size of the lens, as well as a sapphire exit window 804.

Table 2 below presents the prescription for the embodiment of FIG. 8. The F # of the lens is 6, and the chromatically corrected wavelength range is 500 nm to 950 nm.

TABLE 2

Prescription for the lens of FIG. 8

| Lens Element | Surface(s) | Curvature (inches) | Thickness (inches) | Material type | Distance to next element (inches) |
|---|---|---|---|---|---|
| Entry Window | 1, 2 | Flat | 1.375 | Silica_Special glass | 3.070 |
| First Mirror | 3 | Flat | n/a | n/a | 1.842 |
| Second Mirror | 4 | Flat | n/a | n/a | 3.674 |
| First Optical Element | 5 | 2.118 (asp) | 0.418 | NLAK12_SCHOTT glass | 0.100 |
|  | 6 | 4.432 |  |  |  |
| Second Optical Element | 7 | 3.312 | 0.293 | NLAF_SCHOTT glass | 0.158 |
|  | 8 | 1.763 |  |  |  |
| Aperture Stop | 9 | Flat | 0.182 | n/a | n/a |
| Third Optical Element | 10 | 3.831 | 0.585 | NLAK22_SCHOTT glass | 0 |
|  | 11 | −0.835 |  |  |  |
| Fourth Optical Element | 12 | −0.835 | 0.305 | NKZFS11_SCHOTT glass | 0.892 |
|  | 13 | 6.479 |  |  |  |
| Fifth Optical Element | 14 | 6.960 | 0.850 | NLAF33_SCHOTT glass | 1.832 |
|  | 15 | −8.637 (asp) |  |  |  |
| Sixth Optical Element | 16 | −2.556 | 0.400 | SBAH28_OHARA glass | 0.192 |
|  | 17 | −38.536 (asp) |  |  |  |
| Color Filter | 18, 19 | flat | 0.118 | 'OG-570' glass | 0.120 |

TABLE 2-continued

Prescription for the lens of FIG. 8

| Lens Element | Surface(s) | Curvature (inches) | Thickness (inches) | Material type | Distance to next element (inches) |
|---|---|---|---|---|---|
| Exit Window | 20, 21 | flat | 0.039 | SAPHIR_SPECIAL saphire | 0.016 (to image plane) |

It is notable that optical elements 3 and 4 are adhered to each other, such that from an optics design point of view surfaces 11 and 12 represent a single surface that is shared between optical elements 3 and 4.

The indications "(asp)" included in the curvature column for surfaces 5, 15, and 17 indicate that these surfaces are aspheric. The aspheric coefficients for these optical element surfaces are given below, according to the aspheric equation:

$$Z = \frac{Cr^2}{1 + \sqrt{1 - (1+k)C^2 r^2}} + Ar^4 + Br^6 + Cr^8 + Dr^{10} \quad (5)$$

Where:
Z=sag of the surface parallel to the z-axis
c=curvature at the pole of the surface (CUY)
r=radial distance=$\sqrt{x^2+y^2}$
A-D=deformation coefficients
k=conic constant
  Where k=$-e^2$, where e is the eccentricity
    k=0 for a sphere
    $-1<k<0$ for an ellipsoid with major axis on the optical axis (prolate spheroid)
    k=$-1$ for a paraboloid
    k<$-1$ for a hyperboloid
    k>0 for an oblate spheroid (not a conic section) where the surface is generated by rotating an ellipse about its minor axis, and k=$e^2/1-e^2$
Aspheric Coefficients for Surfaces of Table 2 (all Other Surfaces are Non-Aspherical):
Surface 5:
  K: $-0.637509$
  A: 0.288604E-02 B: $-0.612056$E-03 C: 0.327038E-04 D: $-0.265226$E-03
Surface 15
  K: 0.000000
  A: 0.508755E-03 B: $-0.710271$E-03 C: $-0.104589$E-04 D: 0.236440E-05
Surface 17
  K: 0.000000
  A: $-0.542253$E-02 B: $-0.690349$E-04 C: 0.962767E-04 D: $-0.604901$E-05

The foregoing description of the embodiments of the present disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the present disclosure to the precise form disclosed. Many modifications and variations are possible in light of this disclosure.

Although the present application is shown in a limited number of forms, the scope of the present disclosure is not limited to just these forms, but is amenable to various changes and modifications without departing from the spirit thereof. The disclosure presented herein does not explicitly disclose all possible combinations of features that fall within the scope of the present disclosure. The features disclosed herein for the various embodiments can generally be interchanged and combined into any combinations that are not self-contradictory without departing from the scope of the present disclosure. In particular, the limitations presented in dependent claims below can be combined with their corresponding independent claims in any number and in any order without departing from the scope of this disclosure, unless the dependent claims are logically incompatible with each other.

We claim:

1. An orthoscopic lens configured to form an image of an object on an image plane, the lens comprising, in order from the object to the image plane:
   a first optical group having a positive optical power;
   a second optical group having a negative optical power;
   a third optical group having a positive optical power;
   a fourth optical group having a positive optical power; and
   a fifth optical group having a negative optical power;
   the lens further comprising an aperture stop positioned between the second and third optical groups;
   wherein a residual distortion of said lens does not exceed 0.2% over a full field of view of more than 60°;
   wherein the lens is apochromatic over a spectral range of 500 nm to 950 nm to less than 7 microns;
   wherein the lens has an F # of less than 6.5;
   wherein the lens has an overall length of less than 7 inches as measured from a first surface of the first optical element to the image plane; and
   wherein the lens has a focal length of greater than 3 inches.

2. The orthoscopic lens of claim 1 wherein a focal length of the lens does not change as a function of temperature by more than 0.0015 inches within a temperature range of 0° C.-40° C.

3. The orthoscopic lens of claim 1 wherein the optical groups include optical elements made from at least six different types of optical glasses.

4. The orthoscopic lens of claim 1 wherein the first optical group comprises one optical element having a positive optical power, and being arranged to converge light received from the object and to direct the converged light onto the second optical group.

5. The orthoscopic lens of claim 4, wherein the optical element of said first optical group is shaped as a positive meniscus whose concave surface faces toward the image plane.

6. The orthoscopic lens of claim 5, wherein a first surface of the optical element of the first optical group is formed aspherical.

7. The orthoscopic lens of claim 4, wherein the optical element of the first optical group is made out crown glass.

8. The orthoscopic lens of claim 1 wherein the second optical group comprises one optical element having a negative optical power, and being arranged to diverge light received from the first optical group and to direct the diverged light onto the third optical group.

9. The orthoscopic lens of claim 8, wherein the optical element of the second optical group is shaped as a negative meniscus whose concave surface faces toward the image plane.

10. The orthoscopic lens of claim 8, wherein the optical element of the second optical group is made out of flint glass.

11. The orthoscopic lens of claim 1, wherein the third optical group comprises two optical elements, being a first optical element of the third optical group and a second optical element of the third optical group, wherein the first optical element of the third optical group is closer to the object than the second optical element of the third optical group, and wherein the first optical element of the third optical group has a positive optical power, and the second optical element of the third optical group has a negative optical power, the third optical group being arranged to converge the light from the second optical group and to direct the converged light onto the fourth optical group.

12. The orthoscopic lens of claim 11, wherein the first optical element of the third optical group is shaped as a double convex lens, and the second optical element of the third optical group is shaped as a double concave lens.

13. The orthoscopic lens of claim 11, wherein the first and second optical elements of the third optical group are cemented together into a doublet.

14. The orthoscopic lens of claim 11, wherein the first optical element of the third optical group is made out of crown glass, and the second optical element of the third optical group is made out of flint glass.

15. The orthoscopic lens of claim 1, wherein the fourth optical group comprises one optical element having a positive optical power, and being arranged to converge light received from the third optical group and to direct the converged light onto the fifth optical group.

16. The orthoscopic lens of claim 15, wherein the optical element of the fourth optical group is shaped as a double convex lens.

17. The orthoscopic lens of claim 15, wherein the optical element of the fourth optical group is bounded by a first surface and a second surface, the first surface being closer to the object than the second surface, the second surface being formed aspherical.

18. The orthoscopic lens of claim 15, wherein the optical element of the fourth optical group is made out of flint glass.

19. The orthoscopic lens of claim 1, wherein the fifth optical group comprises one optical element having a negative optical power, and being arranged to converge light received from the fourth optical group and to direct the diverged light onto the image plane.

20. The orthoscopic lens of claim 19, wherein the optical element of the fifth optical group is shaped as a negative meniscus whose concave surface faces toward the object.

21. The orthoscopic lens of claim 19, wherein the optical element of the fifth optical group is bounded by a first surface and a second surface, the first surface being closer to the object than the second surface, the second surface being formed aspherical.

22. The orthoscopic lens of claim 19, wherein the optical element of the fifth optical group is made out of flint glass.

23. The orthoscopic lens of claim 1 wherein:

$0.9 < F'10/F'1 < 1.25;$ $-1.15 < F'10/F'20 < -0.9;$ $0.45 < F'10/F'30 < 0.65;$ $0.95 < F'10/F'40 < 1.25;$ and $-1.65 < F'10/F'50 < -1.35;$ where:
F'1 is the focal length of the lens; and
F'10, F'20, F'30, F'40 and F'50 are the focal lengths of the first, the second, third, fourth and fifth optical groups respectively.

24. The orthoscopic lens of claim 23, wherein:
the first optical group includes one optical element, which is numbered as element 11;
the second optical group includes one optical element, which is numbered as element 21;
the third optical group includes two optical elements, which are numbered elements 31 and 32, element 31 being closer to the object than element 32;
the fourth optical group includes one optical element, which is numbered as element 41;
the fifth optical group includes one optical element, which is numbered as element 51; and, for the wave length 587.5618 nm;

$-0.80 < F'31/F'32 < -0.60;$ $0.90 < F'10/OAL < 1.10;$ $0.85 < n11/n21 < 1.10;$ $0.75 < n11/n31 < 1.25;$ $0.95 < n31/n32 < 1.15;$ $1.05 < n11/n41 < 1.30;$ $1.35 < n11/n51 < 1.65;$ $1.15 < V11/V21 < 1.35;$ $1.3 < V31/V32 < 1.45;$ $1.20 < V11/V41 < 1.40;$ and $0.95 < V11/V51 < 1.15,$ where:
OAL is a length of the lens 1 from the image plane to a surface of element 11 that is closest to the object;
n11 is the refractive index of element 11;
n21 is the refractive index of element 21;
n31 is the refractive index of element 31;
n32 is the refractive index of element 32;
n41 is the refractive index of element 41;
n51 is the refractive index of element 51;
V11 is the Abbe number of element 11;
V21 is the Abbe number for element 21;
V31 is the Abbe number for element 31;
V32 is the Abbe number for element 32;
V41 is the Abbe number for element 41; and
V51 is the Abbe number for element 51.

25. The orthoscopic lens of claim 23 wherein:

$2.25 < (dn/dT)11/(dn/dT)21 < 2.75;$ $0.45 < (dn/dT)31/(dn/dT)32 < 0.65;$ $-0.5 < (dn/dT)11/(dn/dT)41 < -0.25;$ $-0.6 < (dn/dT)11/(dn/dT)51 < -0.3;$ $0.85 < CTE11/CTE12 < 1.3;$ $0.9 < CTE31/CTE32 < 1.1;$ $1.2 < CTE11/CTE41 < 1.6;$ $0.8 < CTE11/CTE51 < 1.4;$ and $0.35 < CTE11/CTEh < 0.65,$ where:
- (dn/dT)11, (dn/dT)21, (dn/dT)31, (dn/dT)32, (dn/dT)41 and (dn/dT)51 are the changes of the refractive indices with temperature of elements 11, 21, 31, 32, 41, and 51, respectively;
- CTE11, CTE21, CTE31, CTE32, CTE41 and CTE51 are coefficients of thermal expansion of elements 11, 21, 31, 32, 41, and 51, respectively; and
- CTEh is a coefficient of thermal expansion of a lens mechanical housing that holds and positions elements 11, 21, 31, 32, 41, and 51 in the lens.

26. An orthoscopic lens configured to form an image of an object on an image plane, the lens comprising, in order from the object to the image plane:
- a first optical group having a positive optical power;
- a second optical group having a negative optical power;
- a third optical group having a positive optical power;
- a fourth optical group having a positive optical power; and
- a fifth optical group having a negative optical power;
- the lens further comprising an aperture stop positioned between the second and third optical groups;
- wherein a residual distortion of said lens does not exceed 0.2% over a full field of view of more than 60°;
- wherein the lens is apochromatic over a spectral range of 500 nm to 950 nm to less than 7 microns;
- wherein the lens has an F # of less than 6.5;
- wherein the lens has an overall length of less than 7 inches as measured from a first surface of the first optical element to the image plane; and
- wherein the lens has a focal length of about 5.1 inches.

* * * * *